UNITED STATES PATENT OFFICE 2,375,733

PREPARATION OF DITHIOAMMELIDE

Donald W. Kaiser, Riverside, Conn., assignor to American Cyanamid Company, New York, N. Y., a corporation of Maine No Drawing. Application September 14, 1943, Serial No. 502,295

8 Claims. (Cl. 260—249.5)

This invention relates to a new method of preparing dithioammelide and alkaline salts thereof.

The compound known as dithioammelide has the empirical formula $C_3N_4S_2H_4$ and the following structural formula:

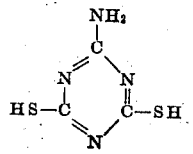

In common with other heterocyclic compounds of this type it may exsist in several tautomeric forms. The form illustrated may be specifically designated as 2-amino-4,6-dithiol-1,3,5-triazine. Dithioammelide is a known compound having been prepared, it is stated, from persulfocyanic acid and potassium hydrosulfide and also by the reaction of 2-amino-4,6-dichloro-1,3,5-triazine with alkali sulfides. I have discovered that dithioammelide may also be prepared by an entirely different method which possesses numerous advantages over previously known methods of preparing this useful compound.

I have discovered that dithioammelide, and its alkaline salts, may be prepared by treating an alkaline salt of ω-cyanoguanidodithiocarbonic acid in accordance with the following equation. For convenience, the dipotassium salt of ω-cyanoguanidodithiocarbonic acid is used to illustrate the reaction.

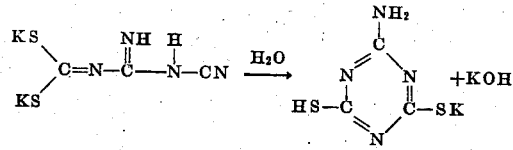

The product, monopotassium dithioammelide is substantially neutral in reaction and may be recovered from solution by crystallization. The dipotassium salt which may be formed by treatment with excess potassium hydroxide is alkaline in reaction. Being more water soluble it is more difficult to crystallize from solution.

Dithioammelide is obtained upon neutralization of the product of the above reaction with an acid. Although intermediate products such as the potassium salt of 2-thio-4-imino-6-amino-1,3,5-thiadiazine can be postulated I have not been able, as yet, to isolate these intermediate compounds. This conversion of ω-cyanoguanidodithiocarbonate to dithioammelide salts may take place at any temperature from about room temperature to 250° C., or higher, as will be shown in the specific examples which follow.

I have also discovered that dithioammelide and its alkaline salts may be prepared, more conveniently, from thiadiazine. This latter compound, 2-thio-4,6-diamino-1,3,5-thiadiazine, also may exist in whole or in part in one or more tautomeric forms, as for example:

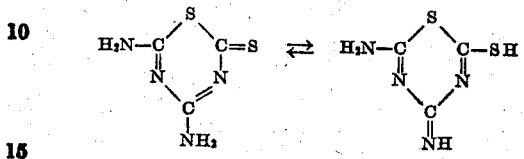

When treated with an alkaline material having a dissociation constant of about $1 \times 10^{-5}$, or more, thiadiazine, or its tautomer, is converted to a salt of ω-cyanoguanidodithiocarbonic acid as shown by the following equation:

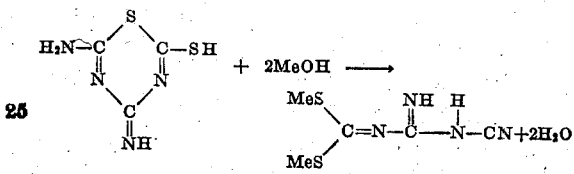

Although it might appear that the acidic group of the thiadiazine tautomer, 2-thiol-4-imino-6-amino-1,3,5-thiadiazine, would be simply neutralized by the alkaline material to yield a salt, this does not seem to be the case. I have observed that two equivalents of a univalent alkali are necessary to dissolve the thiadiazine at room temperature and that such solutions are yellow in color. Since the alkaline salts of ω-cyanoguanidodithiocarbonate are highly soluble and give yellow colored solutions, it appears most likely that the thiadiazine is converted to the ω-cyanoguanidodithiocarbonate as illustrated by the equation just given. Dithioammelide is then formed from ω-cyanoguanidodithiocarbonate in accordance with the first equation above.

From the foregoing, it will appear that my new process of preparing dithioammelide utilizes a salt of ω-cyanoguanidodithiocarbonic acid. For a number of reasons, however, I prefer to use thiadiazine as my starting material. One of the principal reasons for my preference arises from the fact that salts of ω-cyanoguanidodithiocarbonic acid are relatively unstable and tend to decompose when stored for appreciable lengths of time. Furthermore, ω-cyanoguanidodithiocarbonates are very water soluble and it is difficult to prepare the compounds directly in a high state of purity. To obtain pure ω-cyanoguanidodithiocarbonates an aqueous solution thereof is treated with an acid whereby 2-thio-4,6-diamino-1,3,5-thiadiazine is precipitated. This latter product is insoluble and can be washed free from impurities. Treatment with dilute solutions of alkalis reconverts it to the soluble ω-cyanoguanidodithiocarbonate salt. The thiadiazine is very stable and may be stored and converted to a desired ω-cyanoguanidodithiocarbonate when the need for the latter compound arises.

In preparing dithioammelide or its alkaline salts from thiadiazine it is merely necessary to suspend the latter in water or some other organic liquid, such as ethyl alcohol, monoethyl ether of ethylene glycol, dioxane, or mixtures thereof, and add the necessary amount of alkaline material as indicated by the equations above. When using monovalent alkali-metal hydroxides such as potassium hydroxide, sodium hydroxide, lithium hydroxide, or the like, one to two equivalents of the alkali-metal hydroxide are employed. When using an alkaline material such as sodium carbonate, barium hydroxide, calcium hydroxide, etc., only one-half to one molecular equivalent of the alkaline material is used. If more than the necessary amount of alkaline material is used some decomposition of the reactants or intermediate products may occur. This decomposition is evidenced by the evolution of ammonia and hydrogen sulfide from the reaction mixture. If less than the theoretical amount of alkaline material is used all of the thiadiazine will not be converted to dithioammelide.

As shown in the specific examples, the length of time required to complete the reaction varies considerably depending upon the temperature. At room temperature the reaction is extremely slow and requires days for completion. At temperatures of the order of 100° C., the reaction is substantially complete within a few minutes. Accordingly, I prefer to use temperatures of about 50° C. to 110° C. at atmospheric pressure. At higher temperatures under pressure the reaction is complete within a few seconds.

As shown by the equations, the dithioammelide is first obtained in the form of its alkaline salt. This product can be recovered by crystallization from the reaction mixture as shown in the specific examples. If desired it can be recovered as free dithioammelide by merely neutralizing the alkaline salt whereupon the free dithioammelide is formed and precipitated.

The salts of ω-cyanoguanidodithiocarbonic acid which I employ may be prepared by suspending an alkali metal salt of dicyandiamide in a water miscible nonhydroxylated solvent, such as acetone, and adding carbon disulfide thereto in amounts sufficient to yield the desired product. The thiadiazine is prepared from these alkali metal salt of ω-cyanoguanidodithiocarbonic acid by treating an aqueous solution of the latter with an acid or acidic material whereupon the thiadiazine is precipitated. Illustration of the preparation of these compounds will be found in Example 1.

My invention will now be illustrated in greater detail by means of the following examples in which dithioammelide is prepared from salts of ω-cyanoguanidodithiocarbonic acid and the thiadiazine under a variety of different reaction conditions. It should be understood, however, that these examples are intended only to illustrate certain specific details of my new process of preparing dithioammelide and are not to be construed as limiting my process to the specific manipulating steps employed therein.

Example 1

A slurry of 10.5 lbs. of dicyandiamide in 9 gallons of acetone was stirred with a Lightnin mixer and cooled to 4° C. Seventeen pounds of 85% potassium hydroxide pellets, 11 lbs. of carbon bisulfide and two handfuls of snow (about 100 cc. of water) were then added. The temperature slowly rose to 17° C. and remained at this temperature for about three quarters of an hour and then dropped to 14° C. where it remained for 3 hours. At the end of this time, the vessel contained a finely divided, granular, pale yellow slurry of dipotassium ω-cyanoguanidodithiocarbonate. After reaction was complete, the solid was filtered, dissolved in about 46 gallons of water and acidified. Filtration gave 44.5 lbs. of wet product containing 14.5 lbs. of 2-thio-4,6-diamino-1,3,5-thiadiazine on a dry basis.

The damp thiadiazine was slurried in 12 gallons of water and heated to 90° C. Addition of a solution of 50 mols of sodium hydroxide caused a mild exothermic reaction. One pound of Darco was added and the temperature maintained at 97–100° C. for one-half hour. The solution was then poured onto ice, filtered, and acidified. The nearly colorless, finely divided dithioammelide was centrifuged, washed with water, and dried in an oven. The yield was 11.4 lbs. representing a conversion from 2-thio-4,6-diamino-1,3,5-thiadiazine of 79%.

Example 2

A solution of 160 g. (1 mol) of 2-thio-4,6-diamino-1,3,5-thiadiazine in 250 cc. of water which contained 132 g. (2 mols) of 85% potassium hydroxide was heated to 55° C. After 3 hours, colorless crystals began to appear. Heating was continued for 4.5 hours longer and after standing over night, the crystals which formed were separated from their mother liquor by filtration. The crystals were found to be monopotassium dithioammelide hemihydrate.

Example 3

59 g. of dipotassium ω-cyanoguanidodithiocarbonate was dissolved in a minimum of water and the solution allowed to stand at room temperature for 3 weeks. During this time crystals of monopotassium dithioammelide hemihydrate separated out. These were separated from their mother liquor by filtration. Upon acidification of the filtrate with acetic acid an additional quantity of free dithioammelide was precipitated.

Example 4

708 g. of dipotassium ω-cyanoguanidodithiocarbonate was dissolved in boiling water, crystals of monopotassium dithioammelide hemihydrate soon appeared. More water was added to dissolve the crystals and the solution was then filtered to remove a small amount of insoluble material. After cooling the filtrate, dense clusters of monopotassium dithioammelide crystallized from solution. These were separated by filtration. Acidification of the filtrate with acetic acid precipitated dithioammelide which was later recovered and dried.

Example 5

A solution of 80 g. (0.5 mol) of 2-thio-4,6-diamino-1,3,5-thiadiazine and 34.5 g. (0.25 mol) of potassium carbonate in 600 cc. of a 50% aqueous solution of a monoethyl ether of ethylene glycol was heated for about 15 minutes. The solution was then treated with decolorizing charcoal, filtered, cooled and acidified with acetic acid. Dithioammelide was precipitated as a light yellow solid which when filtered and dried weighed 81 g., representing a yield of 76.5% of theoretical.

Example 6

A solution of 80 g. of 2-thio-4,6-diamino-1,3,5-thiadiazine in 500 cc. of concentrated ammonium hydroxide was placed in a flask and allowed to stand at room temperature for 3 days. During this time, crystals of the ammonium salt of dithioammelide separated from solution. The separated solid was dissolved in a dilute solution of sodium hydroxide, treated with decolorizing charcoal, filtered and then reprecipitated with acetic acid. The product was dithioammelide.

Example 7

A solution of 80 g. of 2-thio-4,6-diamino-1,3,5-thiadiazine, 157.5 g. of barium hydroxide octahydrate in 350 cc. of water was allowed to stand at room temperature for 8 days. During this time a solid separated from the mixture. This solid, the barium salt of dithioammelide, was separated by filtration and washed with dilute hydrochloric acid to obtain free dithioammelide. This product was then purified by dissolving in a dilute solution of sodium hydroxide, treating with decolorizing charcoal and the solution filtered and the nearly colorless filtrate acidified. Dithioammelide was precipitated upon acidification.

Example 8

A solution of 47.2 g. of dipotassium ω-cyanoguanidodithiocarbonate in 300 cc. of water was neutralized with dilute hydrochloric acid. The resulting slurry of 2-thio-4,6-diamino-1,3,5-thiadiazine was heated to 95° C. and 10 g. of sodium hydroxide and decolorizing charcoal added. The solution was then heated for one-half hour at 95° C. and then poured over a mass of cracked ice. The solution was filtered and the filtrate acidified with acetic acid. Upon acidification, dithioammelide was precipitated as a pure white crystalline product. Chemical analysis of the product checked with the theoretical values for dithioammelide.

Example 9

A slurry of 32 g. of 2-thio-4,6-diamino-1,3,5-thiadiazine in 300 cc. of water was heated to 95° C. and 15 g. of potassium hydroxide added thereto. After heating for 5 minutes, the solution was poured over cracked ice, filtered and then acidified with acetic acid. The product was recovered by filtration and when dried was found to be highly pure dithioammelide.

Example 10

A stirred suspension of 32 g. (0.20 mol) of 2-thio-4,6-diamino-1,3,5-thiadiazine in 200 cc. of water was heated to boiling. A solution of 8.3 g. of 95% sodium hydroxide in 100 cc. of water was then slowly added. After addition of all of the alkali, complete solution resulted. Decolorizing charcoal was added, the solution filtered, cooled, and acidified with acetic acid. The dithioammelide precipitated as a nearly colorless, finely-divided amorphous solid. The product was filtered, washed with water and dried in an oven at 100° C. The conversion represented an 81% yield.

Example 11

After refluxing a mixture of 16 g. (0.10 mol) of 2-thio-4,6-diamino-1,3,5-thiadiazine, 28.8 g. (0.20 mol) of triethanolamine, and 250 cc. of water for 15 minutes almost complete solution resulted. Decolorizing charcoal was added, the solution filtered, cooled, and acidified with acetic acid. The nearly colorless precipitate of dithioammelide was filtered, washed with water and allowed to dry, giving a 69% yield of product.

Example 12

A mixture of 16.0 g. (0.10 mol) of 2-thio-4,6-diamino-1,3,5-thiadiazine, 7.3 g. (0.10 mol) of mono-n-butylamine and 250 cc. of water was refluxed for 10 minutes. Decolorizing charcoal was added and after filtration the solution was cooled and acidified with acetic acid. Filtration of the resulting precipitate followed by washing with water and ethanol gave a colorless, finely divided product which was identified as dithioammelide.

I claim:

1. A method of preparing dithioammelide having in one of its tautomeric forms the formula:

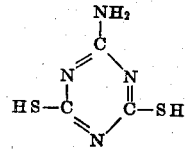

and alkaline salts thereof which comprises heating a solution containing an alkaline salt of ω-cyanoguanidodithiocarbonic acid said acid having in one of its tautomeric forms the formula:

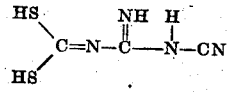

at a temperature of at least 50° C. until a dithioammelide is formed and recovering the thus formed dithioammelide.

2. A method of preparing dithioammelide having in one of its tautomeric forms the formula:

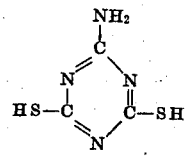

which comprises heating a solution containing an alkaline salt of ω-cyanoguanidodithiocarbonic acid said acid having in one of its tautomeric forms the formula:

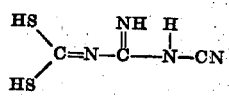

at a temperature of at least 50° C. until an alkaline salt of dithioammelide has been formed and thereafter neutralizing the latter product with an acid to form dithioammelide and recovering the thus formed dithioammelide.

3. A method of preparing dithioammelide having in one of its tautomeric forms the formula:

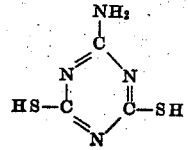

and alkaline salts thereof which comprises treating 2-thio-4,6-diamino-1,3,5-thiadiazine having in one of its tautomeric forms the formula:

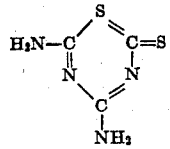

with an alkaline material having a dissociation constant of at least $1\times10^{-5}$ and allowing the reaction to proceed until an alkaline salt of dithioammelide has formed and recovering the thus formed dithioammelide.

4. A method of preparing dithioammelide having in one of its tautomeric forms the formula:

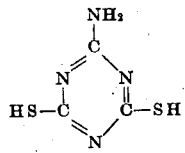

and its alkaline salts which comprises heating at a temperature of at least 50° C., 2-thio-4,6-diamino-1,3,5-thiadiazine having in one of its tautomeric forms the formula:

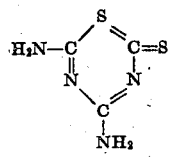

with an alkaline material having a dissociation constant of at least $1\times10^{-5}$ until an alkaline salt of dithioammelide has been formed and recovering the thus formed dithioammelide.

5. A method of preparing dithioammelide having in one of its tautomeric forms the formula:

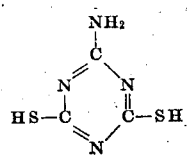

which comprises heating at a temperature of at least 50° C., 2-thio-4,6-diamino-1,3,5-thiadiazine having in one of its tautomeric forms the formula:

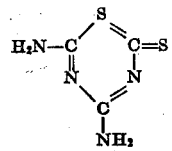

and an alkaline material having dissociation constant of at least $1\times10^{-5}$ until an alkaline salt of dithioammelide has been formed and thereafter neutralizing the said salt of dithioammelide with an acid to produce dithioammelide and recovering the thus formed dithioammelide.

6. A method of preparing monopotassium dithioammelide having in one of its tautomeric forms the formula:

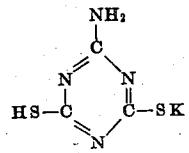

which comprises the step of heating 2-thio-4,6-diamino-1,3,5-thiadiazine having in one of its tautomeric forms the formula:

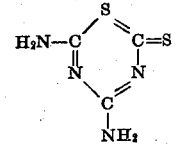

with potassium hydroxide until monopotassium dithioammelide has been formed and recovering the thus formed dithioammelide.

7. A method of preparing dithioammelide having in one of its tautomeric forms the formula:

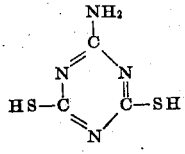

which comprises heating at a temperature of at least 50° C., 2-thio-4,6-diamino-1,3,5-thiadiazine having in one of its tautomeric forms the formula:

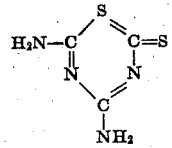

with an alkali metal hydroxide until an alkali metal salt of dithioammelide has been formed and then neutralizing the said salt with an acid to form dithioammelide and recovering the thus formed dithioammelide.

8. A method of preparing dithioammelide having in one of its tautomeric forms the formula:

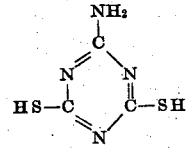

which comprises heating an aqueous solution of an alkali metal salt of ω-cyanoguanidodithiocarbonic acid said acid having in one of its tautomeric forms the formula:

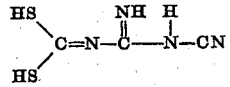

at a temperature of at least 50° C. until an alkali metal salt of dithioammelide has been formed and then neutralizing the said salt with an acid to form dithioammelide and recovering the thus formed dithioammelide.

DONALD W. KAISER.